United States Patent [19]

Hayward et al.

[11] Patent Number: 5,115,260
[45] Date of Patent: May 19, 1992

[54] COMPACT STRAIN RELIEF DEVICE FOR FIBER OPTIC CABLES

[75] Inventors: Curtis E. Hayward, Rhinebeck; Gerald W. Peterson, Poughkeepsie; Robert E. Post, Connelly, all of N.Y.

[73] Assignee: International Business Machines Corporation, Armonk, N.Y.

[21] Appl. No.: 577,415

[22] Filed: Sep. 4, 1990

[51] Int. Cl.⁵ .................. G02B 6/44; H02G 15/064
[52] U.S. Cl. .................. 385/100; 174/255; 174/72 A; 174/73.1; 385/136
[58] Field of Search ............ 350/96.10, 96.23, 96.30; 174/61, 65 R, 67, 66, 255, 72 A, 70 R, 72 R, 73.1

[56] References Cited

U.S. PATENT DOCUMENTS

| | | | |
|---|---|---|---|
| 3,404,364 | 10/1968 | Paullus et al. | 339/61 |
| 4,039,248 | 8/1977 | Franke et al. | 350/96.23 |
| 4,493,467 | 1/1985 | Borja | 248/56 |
| 4,524,038 | 6/1985 | Heinemann et al. | 264/61 |
| 4,744,627 | 5/1988 | Chande et al. | 350/96.20 |
| 4,762,387 | 8/1988 | Batdorf et al. | 350/96.20 |
| 4,911,510 | 3/1990 | Jenkins | 350/96.10 |
| 4,960,318 | 10/1990 | Nilsson et al. | 350/96.23 |
| 4,980,007 | 12/1990 | Ferguson | 350/96.23 X |
| 4,980,012 | 12/1990 | Nieda et al. | 350/96.23 X |

FOREIGN PATENT DOCUMENTS

| | | | |
|---|---|---|---|
| 0022036 | 1/1981 | European Pat. Off. | 350/96.23 X |
| 2459997 | 6/1976 | Fed. Rep. of Germany | 350/96.23 X |
| 60-175013 | 9/1985 | Japan | 350/96.23 X |

OTHER PUBLICATIONS

Bratvold et al., IBM Technical Disclosure Bulletin, vol. 19, No. 10, pp. 3837-3838 (Mar. 1977).

*Primary Examiner*—Brian Healy
*Attorney, Agent, or Firm*—William A. Kinnaman, Jr.

[57] ABSTRACT

A cable strain relief device comprises a cable manifold having a pair of generally planar surfaces upon opposite sides thereof formed with a plurality of cable receiving channels extending generally lengthwise along the surfaces. The channels are spaced from one another transversely of the length of the manifold and are formed so as to undulate transversely in a serpentine manner to provide strain relief for cables such as fiber optic cables placed in the channels. The channels are sufficiently deep to permit the placement of two cables in each channel.

8 Claims, 2 Drawing Sheets

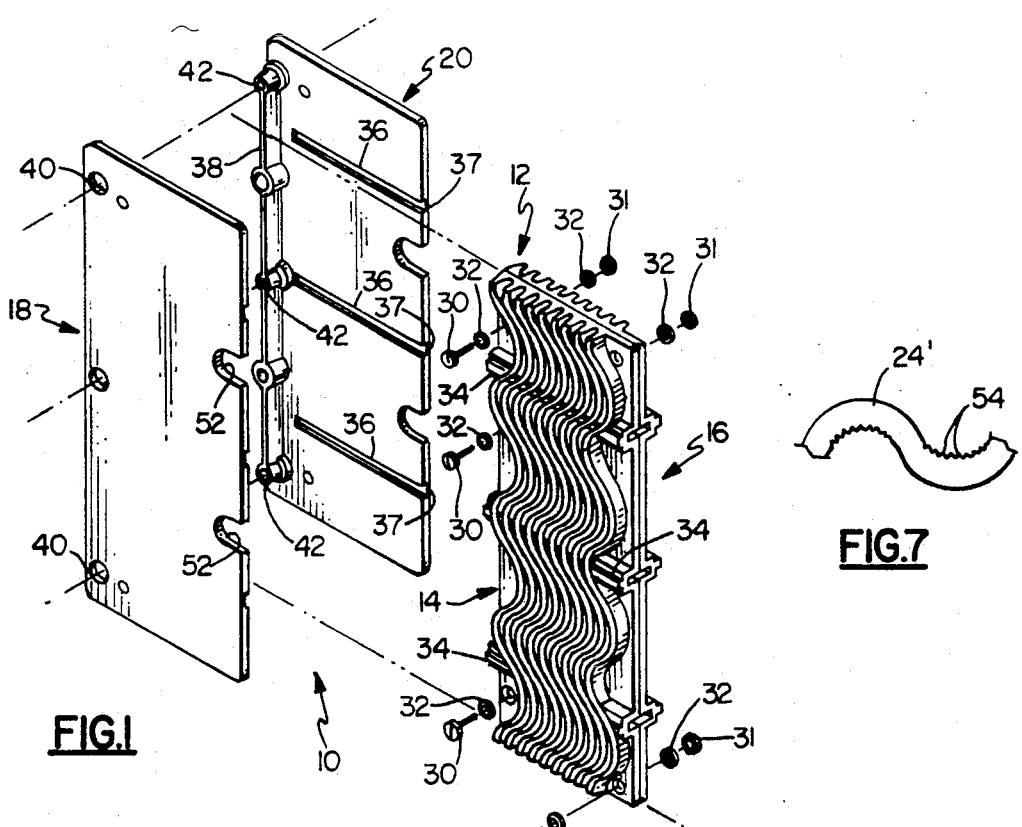
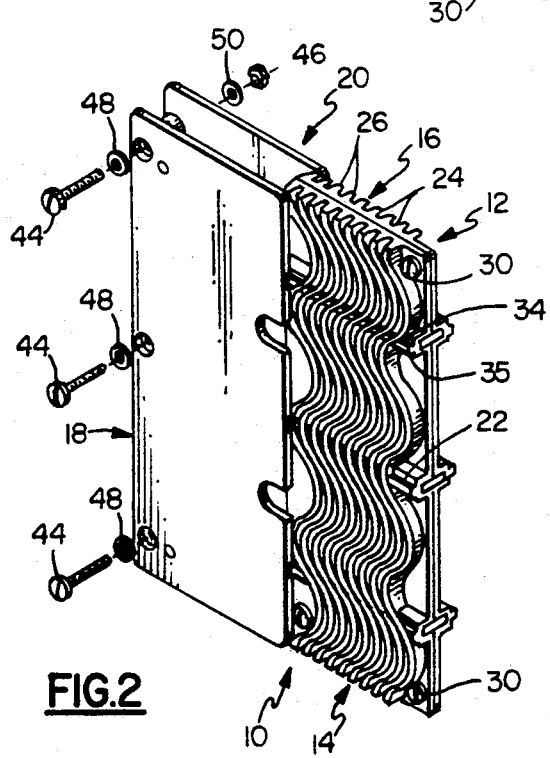
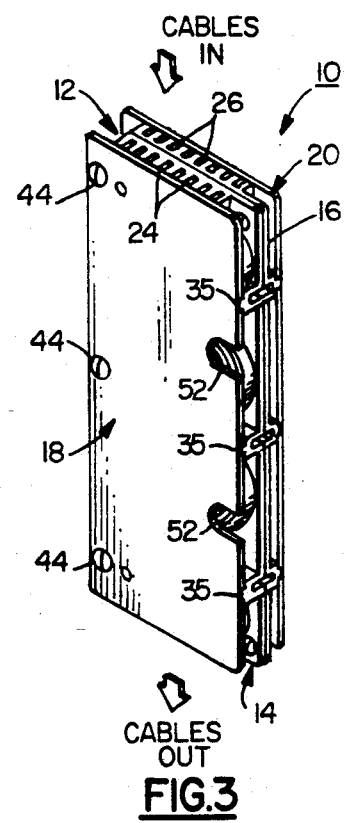

COMPACT STRAIN RELIEF DEVICE FOR FIBER OPTIC CABLES

BACKGROUND OF THE INVENTION

1. Field of the Invention

This invention relates to a strain relief device for use with cables or lines subject to tensive forces, especially cables such as fiber optic cables whose bend radius is constrained.

2. Description of Related Art

The problem of providing adequate protection from external tensive forces upon cables so that the force is essentially reduced to nothing at the termination of the cable or line has been addressed in a number of ways. This protection is necessary in many systems with cabling because there may be fragile and expensive components at the end of the cables. Many strain relief devices of the prior art are too large to be feasibly installed in many systems. For example, strain relief has been achieved by wrapping cables around a mandrel or other cylindrical body. This method, however, becomes impractical when the bend radius of the cable is constrained to be at least a certain minimum. Such bend radius constraints are especially a problem with fiber optic cables, since excessive curvatures may lead to loss of optical quality and strength. In addition, this expedient of the prior art results in an unwieldy and unorganized grouping of cables when more than one cable is involved.

Other strain relief devices of the prior art are application specific in that the means for providing the stress relief is located at the termination of the cable as an integral part of the stress-sensitive component. An example of this type of strain relief device is disclosed in U.S. Pat. No. 3,432,794. In the arrangement shown in the patent, a card frame assembly having rails on the side of the frame is arranged to hold down the cable in a U-shape. Another example of this type of strain relief device is shown in U.S. Pat. No. 3,740,698. In the device described in this latter patent, a housing at the end of a connector is formed with an S-curve section allowing external forces to be absorbed within the configuration of the curve.

Still other strain relief devices are shown in U.S. Pat. Nos. 4,493,467 and 4,744,627 as well as in the IBM Technical Disclosure Bulletin, vol. 20, No. 12, p. 5349. None of the strain relief devices shown in these publications is particularly suitable for use with large numbers of fiber optic cables.

SUMMARY OF THE INVENTION

In general the present invention contemplates a cable strain relief device comprising a cable manifold having a generally planar surface formed with a plurality of cable-receiving channels extending generally in a first direction along the surface and spaced from one another in a second direction along the surface normal to the first direction. The channels are so formed as to undulate, preferably in the second direction, in a serpentine manner to provide strain relief for cables such as fiber optic cables placed in the channels.

BRIEF DESCRIPTION OF THE DRAWINGS

FIG. 1 is an exploded view of a strain relief device constructed in accordance with the present invention.

FIG. 2 is a partly exploded view of the strain relief device of FIG. 1 in an intermediate stage of assembly.

FIG. 3 is a perspective view of the strain relief device of FIG. 1 with the manifold subassembly fully inserted into the shroud.

FIG. 7 is a fragmentary view of a modified channel provided with teeth along its walls.

DESCRIPTION OF THE PREFERRED EMBODIMENT

Referring first to FIGS. 1-3, a fiber optic cable strain relief 10 constructed in accordance with the present invention comprises a cable manifold subassembly 12 comprising a pair of cable manifolds 14 and 16. In the embodiment shown in FIG. 1, cable manifolds 14 and 16 are secured to each other back-to-back in a manner to be described below, and are sandwiched between respective outside covers 18 and 20 forming a shroud.

Figure 5:
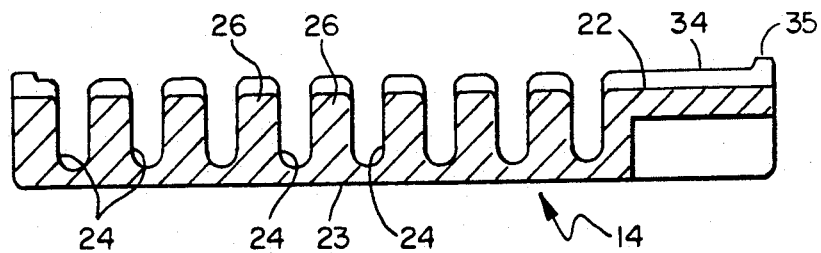
FIG. 5 is an enlarged section of the manifold half shown in FIG. 4 along lines 5—5 thereof.
Figure 4:
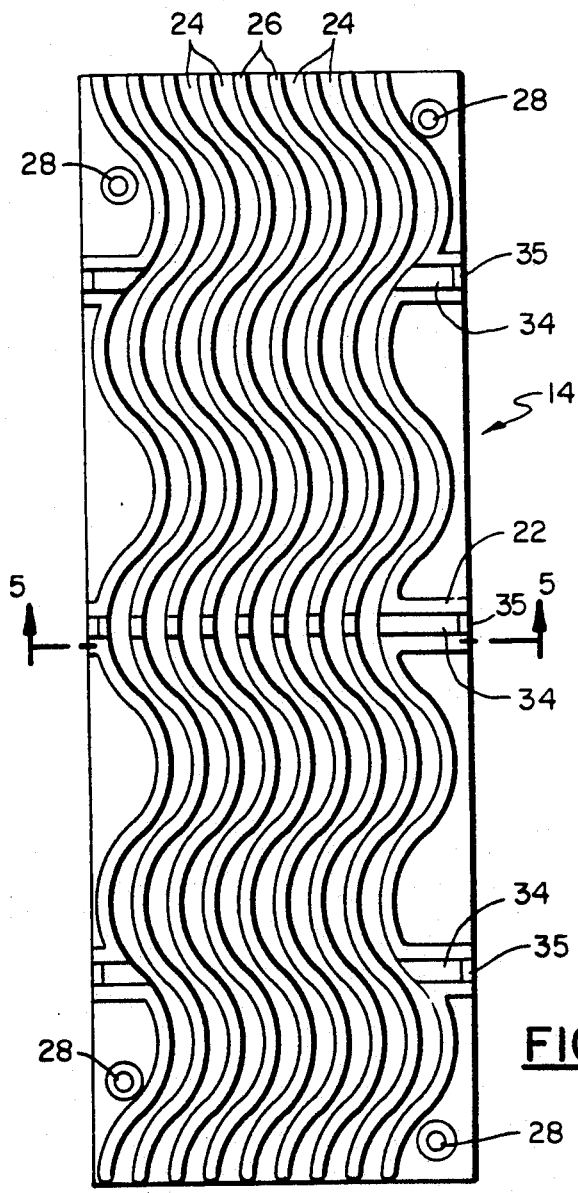
FIG. 4 is a front elevation of one cable manifold half of the assembly shown in FIG. 1.
Figure 6:
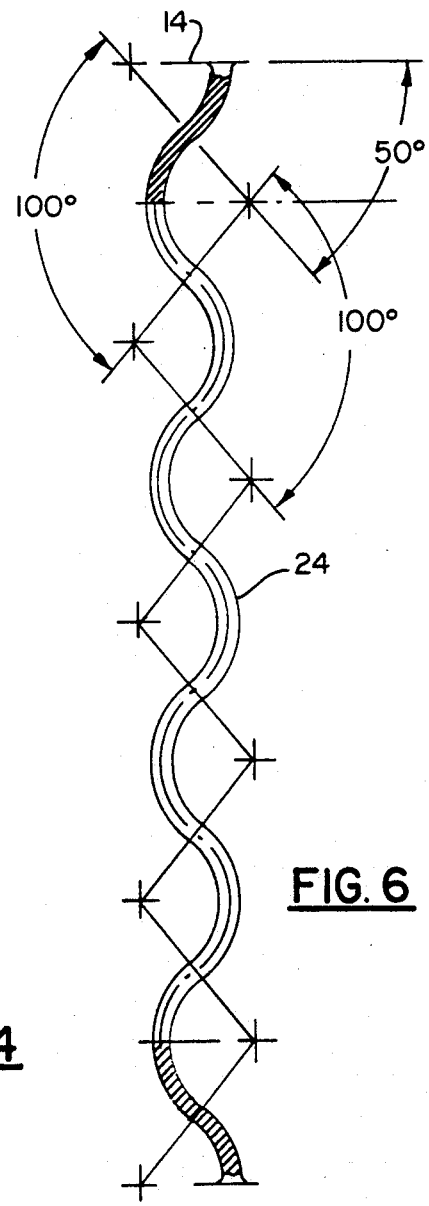
FIG. 6 is an enlarged front elevation of one of the channels of the manifold half shown in FIG. 4.

Cable manifolds 14 and 16 are of similar construction and will be described with reference to cable manifold 14. Referring now to FIGS. 4-6, cable manifold 14 consists of a generally elongated rectangular slab of any suitable material, such as polycarbonate or other molded plastic, having oppositely disposed front and back surfaces 22 and 23. Surface 22 of manifold 14 is formed with a plurality (preferably 8 in the embodiment shown) of grooves or channels 24 extending generally along the length of the manifold as shown in the figures. Each of the channels 24 undulates in a generally sinusoidal manner transversely of the length of the manifold. Preferably, the radius of curvature of each of the channels 24 along its midline, as viewed from the surface 22 in which the channel is formed, is at least a predetermined minimum curvature, such as 25 mm. Preferably, as shown in FIG. 6, each channel 24 consists of successive circular segments of alternating curvatures, each segment subtending an angle of 100 degrees about the center of curvature for that segment. As shown in FIG. 5, each of channels 24 is deep enough to accept two fiber optic cables completely within the channel and is narrow enough to ensure a pinch fit between the cables and the channel walls. As also shown in FIG. 5, each channel 24 preferably has a U-shaped cross-section and is separated from adjacent channels 24 by walls 26, the thickness of which is comparable to the width of the channels 24 to maximize cable density.

Each of cable manifolds 14 and 16 is formed with apertures 28 at its four corners to permit securing two manifolds together in a back-to-back manner as shown in FIG. 1 using screws 30, nuts 31 and washers 32.

In use, the fiber optic cables for which strain relief is to be provided are inserted into the channels 24, either one cable or two cables to a channel. The subassembly 12 of the manifolds 14 and 16 is then slid between the two covers 18 and 20 as shown in FIGS. 2 and 3, with transverse ridges 34 formed on manifolds 14 and 16 above the general level of front surface 22 fitting into grooves 36 formed on the undersides of the covers. Tabs 35 at the ends of ridges 34 project beyond the level of the ridges to engage similar tabs 37 at the ends of grooves 36 in covers 18 and 20 to provide a limit stop when the subassembly is fully inserted. To remove cables from the device 10, the reverse procedure is employed. All of these steps are accomplished without requiring any special tools either to insert or remove cables from the channels 24 or to insert or remove the cable manifold subassembly 12 from the shroud 17.

The covers 18 and 20 are secured to each other along one long edge using screws 44, nuts 46, washers 48 and lock washers 50. Each of the covers 18 and 20 is formed with a longitudinally extending spacer 38 along one side thereof as shown in FIG. 1 to provide a predetermined spacing between the two covers. Indentations 52 along the side edges of covers 18 and 20 remote from spacer 38 and screws 44 permit the user to grip the subassembly 12 to remove it from between the covers for insertion or removal of fiber optic cables. The shroud formed by covers 18 and 20 is secured to the host unit (not shown) by any suitable means.

Although in the form of the invention shown in FIGS. 1 to 3 a pair of cable manifolds are secured back-to-back and sandwiched between manifold covers, a single cable manifold may be used alone without covers if desired. In such an instance, the manifold would be secured directly to the host unit (not shown) with which it is used.

The serpentine channels 24 ensure not only that the walls of the channels grip the outside layer of a cable inserted in the channel, but also that outer layers of the cable itself grip adjacent innerlayers. Tension on the cable, together with its beam stiffness, causes each bend in the channel 24 to compress adjacent cable layers normally relative to the direction of the cable, ensuring against relative longitudinal movement of the cable layers. At the same time, the device does not impact a long-term compressive load on the cable, as do devices that clamp the cable.

As noted above, cable manifold 30 may comprise any suitable material such as molded plastic. If desired, the cable manifold or at least the surfaces of the channels 38 may be provided with a high friction material to increase the grip between the walls of the channels 38 and the fiber optic cables. In addition, if desired, the gripping action of the channel walls on the outside cable layer may be enhanced by providing the smaller-radius portion of each bend with teeth 54 as shown for modified channel 24' in FIG. 7.

While the present invention has been described with particular reference to fiber optic cables, it will be apparent to those skilled in the art that the disclosed device could be used for other cables having similar strain relief requirements.

What is claimed is:

1. A cable strain relief device comprising a cable manifold having a pair of opposite ends and a generally planar surface extending between said ends, said surface being formed with a plurality of cable-receiving channels extending generally in a first direction along said surface between said ends and spaced from one another in a second direction along said surface normal to said first direction, said channels being so formed in said surface as to undulate in said second direction to provide strain relief for cables placed in said channels.

2. A device as in claim 1 in which said manifold has a pair of generally planar surfaces on opposite sides thereof, each of said surfaces being formed with cable-receiving channels.

3. A device as in claim 1 in which each of said channels has a predetermined width and a depth at least twice said predetermined width.

4. A device as in claim 1 further comprising a cover adapted to mate with said generally planar surface.

5. A device as in claim 4 including means for detachably securing said cover to said manifold.

6. A device as in claim 5 in which said cover is slidable relative to said manifold.

7. A device as in claim 1 in which said channels are provided with teeth for gripping a cable placed therein.

8. A device in claim 1 in which said channels are formed with undulations that are aligned with one another.

* * * * *